(12) United States Patent
Fieglein et al.

(10) Patent No.: US 11,810,349 B2
(45) Date of Patent: Nov. 7, 2023

(54) ENSURING SECURITY ON THE FUELING FORECOURT

(71) Applicant: Wayne Fueling Systems LLC, Austin, TX (US)

(72) Inventors: Henry Fieglein, Leander, TX (US); Kalpit Singh, Jaipur (IN); Rohith Chinnaswamy, RoundRock, TX (US); Hob Hairston, Cedar Park, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 59 days.

(21) Appl. No.: 16/885,946

(22) Filed: May 28, 2020

(65) Prior Publication Data

US 2021/0374413 A1 Dec. 2, 2021

(51) Int. Cl.
| | |
|---|---|
| *G06V 20/40* | (2022.01) |
| *A62C 3/00* | (2006.01) |
| *G06V 20/10* | (2022.01) |
| *G06N 20/00* | (2019.01) |

(52) U.S. Cl.
CPC .............. *G06V 20/41* (2022.01); *A62C 3/00* (2013.01); *G06V 20/176* (2022.01); *G06N 20/00* (2019.01)

(58) Field of Classification Search
CPC ............................ G06V 20/41; G06V 20/176
See application file for complete search history.

(56) References Cited

U.S. PATENT DOCUMENTS

| | | | |
|---|---|---|---|
| 8,925,808 B2 | 1/2015 | Harrell | |
| 10,614,689 B2 * | 4/2020 | Bess | H04L 63/302 |
| 10,726,508 B2 | 7/2020 | Morris et al. | |
| 10,778,937 B1 * | 9/2020 | Dingli | G06F 21/32 |
| 11,012,667 B1 * | 5/2021 | Nodder | G06V 20/52 |
| 2003/0041330 A1 | 2/2003 | Smith | |
| 2006/0272832 A1 * | 12/2006 | Biehl | A62C 31/28 |
| | | | 169/65 |
| 2011/0112660 A1 | 5/2011 | Bergmann et al. | |
| 2012/0119921 A1 * | 5/2012 | Farley | G08B 27/005 |
| | | | 340/691.6 |
| 2015/0242855 A1 | 8/2015 | Vilnai | |
| 2016/0271434 A1 | 9/2016 | Dusing et al. | |

(Continued)

FOREIGN PATENT DOCUMENTS

| | | |
|---|---|---|
| CN | 110490124 A | 11/2019 |
| WO | 2021243156 A1 | 12/2021 |

OTHER PUBLICATIONS

International Search Report and Written Opinion for PCT/US2021/034763 dated Oct. 21, 2021 (13 pages).

*Primary Examiner* — David Perlman
(74) *Attorney, Agent, or Firm* — MINTZ LEVIN COHN FERRIS GLOVSKY AND POPEO, PC

(57) ABSTRACT

In one aspect, data characterizing a video feed acquired by a camera oriented toward and including a field of view of a forecourt of a fueling station can be received. The video feed can be monitored for hazards, and the monitoring of the video feed can include performing automatic hazard detection on the video feed using at least one predictive model that predicts a presence of a hazard within the forecourt of the fueling station. A command can be transmitted in response to the detecting of the presence of the hazard within the forecourt of the fueling station. Related apparatus, systems, methods, techniques, and articles are also described.

16 Claims, 4 Drawing Sheets

(56) References Cited

U.S. PATENT DOCUMENTS

| | | | | |
|---|---|---|---|---|
| 2017/0308965 | A1* | 10/2017 | Morris | G07F 13/025 |
| 2018/0053168 | A9* | 2/2018 | Harrell | G07F 9/023 |
| 2018/0308347 | A1* | 10/2018 | Bruck | G01N 27/121 |
| 2020/0387716 | A1* | 12/2020 | Nadler | G06V 40/16 |
| 2021/0279603 | A1* | 9/2021 | Teran Matus | G06N 5/04 |
| 2021/0366096 | A1* | 11/2021 | Cunha | G06V 10/44 |

* cited by examiner

ENSURING SECURITY ON THE FUELING FORECOURT

FIELD

The current subject matter relates to approaches to ensuring security on a fueling forecourt.

BACKGROUND

The current fueling forecourt environment has a number of potentially hazardous scenarios for the patrons of a fueling station, such as fire caused by patrons smoking or sparks caused by backfire or metal dragging on pavement, fuel leaks caused by over-fueling of a vehicle (e.g., car, bus, truck, motorcycle) or due to a fuel dispenser malfunction, and/or unsafe vehicle operation (e.g., speeding, driving toward a dispenser). Typically, these hazards are monitored by other patrons or the attendants inside the store, and as a result action to mitigate these hazards can only be taken after the hazard has been ascertained, the appropriate response has been determined, and how to take action has been communicated. This delayed reaction could result in bodily injury or death to patrons/attendants and/or property damage to the fueling station.

SUMMARY

In general, systems and methods for ensuring security on a fueling forecourt are provided.

In one aspect, data characterizing a video feed acquired by a camera oriented toward and including a field of view of a forecourt of a fueling station can be received. The video feed can be monitored for hazards, and the monitoring of the video feed can include performing automatic hazard detection on the video feed using at least one predictive model that predicts a presence of a hazard within the forecourt of the fueling station. A command can be transmitted in response to the detecting of the presence of the hazard within the forecourt of the fueling station.

One or more of the following features can be included in any feasible combination. For example, an object present within the forecourt of the fueling station can be compared to at least one model object associated with the hazard, a similarity measure indicative of a degree to which the object matches the model object can be determined, and an indication can be transmitted in response to the similarity measure exceeding a predetermined threshold. For example, a notification indicative of the hazard presence can be generated based on the provided command, and the notification can be provided to an end user device. For example, the end user device can include an interactive display of a forecourt controller configured to manage the operation of the fueling station, and the notification can include a prompt configured to be presented on the display. For example, the end user device can include a mobile device, which can include an interactive display, that can be in operable communication with a forecourt controller configured to manage the operation of the fueling station, and the notification can include a prompt configured to be presented on the display. For example, the command can be provided to a fire suppression system, which can be disposed in the forecourt, that can cause the fire suppression system to activate at least one sprinkler to dispense a fire extinguishing agent. For example, the command can be provided to an alarm system having at least one speaker oriented toward the forecourt and can cause an audio message indicative of the hazard presence to be provided via the at least one speaker. For example, the alarm system can include at least one strobe lamp oriented toward the forecourt, and the command can cause the strobe lamp to illuminate to thereby indicate the hazard presence. For example, at least a portion of the fueling station can be deactivated in response to receiving the command. For example, the receiving, the determining, and the generating can be performed by at least one data processor forming part of at least one computing system.

In another aspect, a system is provided and can include at least one data processor and memory storing instructions configured to cause the at least one data processor to perform operations described herein. The operations can include receiving data characterizing a video feed acquired by a camera oriented toward and including a field of view of a forecourt of a fueling station, monitoring the video feed for hazards, the monitoring including performing automatic hazard detection on the video feed using at least one predictive model that predicts a presence of a hazard within the forecourt of the fueling station, and transmitting a command in response to detecting the presence of the hazard within the forecourt of the fueling station.

One or more of the following features can be included in any feasible combination. For example, the operations can further include comparing an object present within the forecourt of the fueling station to at least one model object, the model object associated with the hazard, determining a similarity measure for the object, the similarity measure indicative of a degree to which the object matches the model object, and transmitting an indication in response to the similarity measure exceeding a predetermined threshold. For example, the operations can further include generating a notification indicative of the hazard presence based on the provided command, and providing the notification to an end user device. For example, the end user device can include an interactive display of a forecourt controller configured to manage the operation of the fueling station, and the notification can include a prompt configured to be presented on the display. For example, the end user device can include a mobile device, which can include an interactive display, that can be in operable communication with a forecourt controller configured to manage the operation of the fueling station, and the notification can include a prompt configured to be presented on the display. For example, the command can be provided to a fire suppression system, which can be disposed in the forecourt, that can cause the fire suppression system to activate at least one sprinkler to dispense a fire extinguishing agent. For example, the command can be provided to an alarm system having at least one speaker oriented toward the forecourt and can cause an audio message indicative of the hazard presence to be provided via the at least one speaker. For example, the alarm system can include at least one strobe lamp oriented toward the forecourt, and the command can cause the strobe lamp to illuminate to thereby indicate the hazard presence. For example, the operations can further include deactivating at least a portion of the fueling station in response to receiving the command.

Non-transitory computer program products (i.e., physically embodied computer program products) are also described that store instructions, which when executed by one or more data processors of one or more computing systems, causes at least one data processor to perform the operations described herein. Similarly, computer systems are also described that may include one or more data processors and memory coupled to the one or more data processors. The memory may temporarily or permanently store instructions that cause at least one processor to perform one or more of the operations described herein. In addition, methods described herein can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used.

Some implementations of the current subject matter relate to detecting hazardous situations at a fueling station. A system incorporating the current subject matter can include at least one camera located at a fueling station and a processor configured to receive image and/or video data acquired by the camera. The processor is further configured to continuously monitor the image and/or video data and, using predictive modeling, determine whether a hazard (e.g., flames, lit cigarettes, fuel spills/leaks, vehicles moving at an excessive rate of speed and/or on a collision course with a fuel dispenser) is likely present at the fueling station from the image and/or video data, and to take at least one action to mitigate the risk of harm to people or property at the fueling station. Such an approach can provide automated hazard detection and mitigation of hazardous situations at fueling station with little to no human intervention required.

Figure 1:
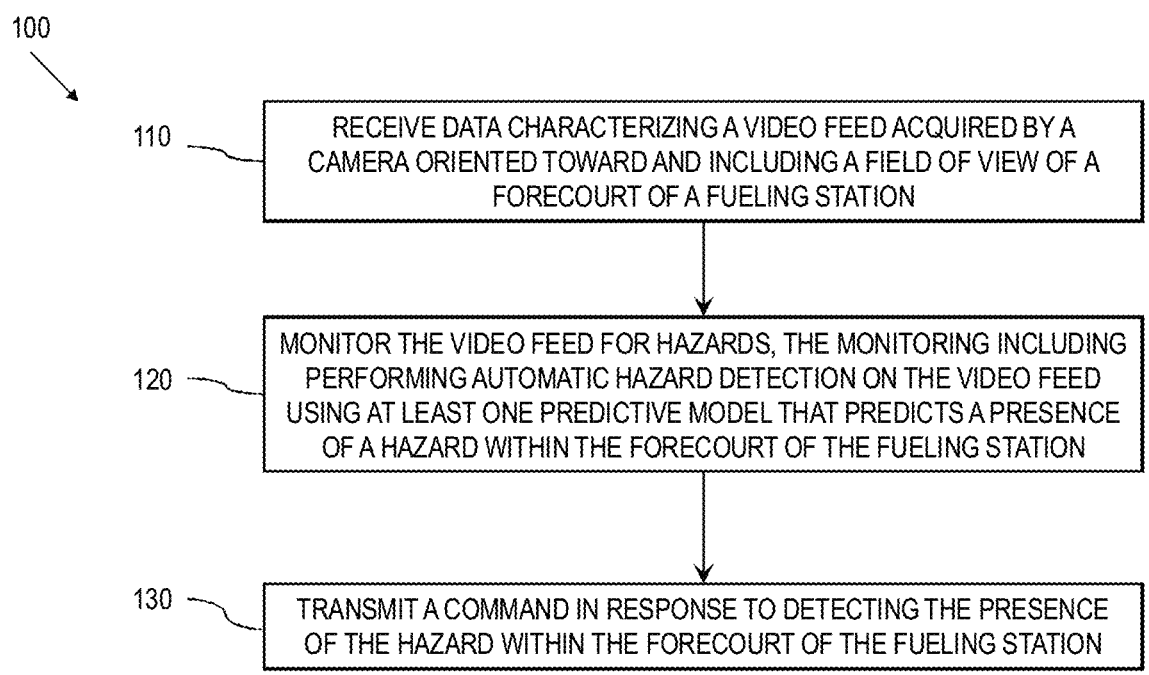
FIG. 1 is a process flow diagram illustrating an example process of some implementations of the current subject matter that can provide for automated threat detection and mitigation at a fueling station.

FIG. 1 is a process flow diagram illustrating an example process 100 of some implementations of the current subject matter that can provide for improved detection of hazardous situations in fueling stations.

At 110, data characterizing a video feed acquired by a camera oriented toward and including a field of view of a forecourt of a fueling station can be received. The video feed can include a continuous stream of image frames recorded by at least one camera that can depict a variety of events that can occur at fueling stations. Example events include the entry and exit of customers wishing to purchase fuel at fuel dispensers located within the forecourt or items at a convenience store located proximate the forecourt, the use of the fuel dispensers in fueling transactions, the use of an air compressor located within the forecourt to inflate the tires of a customer's vehicle, and the like. In some implementations, the camera can be disposed on a fuel dispenser located in the forecourt and oriented such that the drive aisle proximate the fuel dispenser is within the field of view of the camera. In some implementations, the camera can be disposed on a building located proximate the forecourt, such as a car wash building or a convenience store building and oriented such that the fuel dispensers within the forecourt are in the field of view of the camera. In some implementations, there may be multiple cameras, each with different fields of view, which may or may not overlap depending on the implementation.

At 120, the data characterizing the video feed can be monitored for hazards. Such hazards can include the presence of fire or flames in the proximity of the fuel dispensers in the forecourt; the presence of sparks resulting from metal coupled to a customer's vehicle dragging across the pavement in the forecourt; the presence of a lit cigarette proximate a fuel dispenser in use by a customer; the presence of fuel on the ground or leaking out of a customer's vehicle due to a fuel tank breach; over fueling caused by a malfunctioning fuel dispenser or a customer improperly using the fuel dispenser; and/or the movement of cars into/out of/around the forecourt at a dangerously high speed or on a collision course with a customer or with a fuel dispenser, convenience store, or other portion of the fueling station environment.

The monitoring can include performing automatic hazard detection on the video feed using at least one predictive model, which can predict a presence of the hazard within the forecourt of the fueling station. The predictive model, which can include one or more machine learning algorithms, can analyze the images present in the video feed to determine whether one or more hazards are present. For example, in some implementations, the predictive model can recognize a feature present in the video feed and determine whether the feature is substantially correlated with a model feature present in the predictive model that is associated with the hazard. Thereby, the model can predict that there is a high likelihood that the feature present in the video feed is a hazard.

In some implementations, the predictive model can compare the feature to at least one image containing the model feature and determine a similarity measure between the feature and the model feature. The predictive model can transmit an indication that there is a high likelihood that the feature present in the video feed is a hazard when the similarity measure exceeds a predetermined threshold. For example, in analyzing the images present in the video feed, the predictive model can deconstruct each image by using edge and entity detection algorithms to dissect the image into constituent parts. The predictive model can analyze the constituent parts of each image that are positionally associated with known hazards. For example, the predictive model, upon detecting the presence of an individual in the images, can detect and isolate the individual's face and/or arm. The predictive model can then analyze the individual's face and/or arm and look for a feature that resembles a lit cigarette, which is a known hazard in a fueling station environment. The predictive model can compare the feature with model cigarette features and determine a measure of similarity between the feature and the model cigarette feature. If the measure of similarity exceeds a predetermined threshold, the predictive model has determined that there is a high likelihood that the feature is a lit cigarette and can transmit an indication thereof.

In some implementations, the predictive model can analyze the images and generate a string of words describing the detected constituent parts and identified features. The string of words can be derived from words associated with model constituent parts that are part of the predictive model and from the model features, which can be added to the string when the predictive model determines the presence of the constituent part and/or the feature. The predictive model can analyze the string of words for words that are indicative of hazards (e.g., "fire," "lit cigarette," "spilled fuel," "speeding vehicles in the forecourt," etc.) and determine a hazard is likely present based on the inclusion of such words in the string. The model can also receive one or more images depicting the hazard for use in training the model to thereby improve the model's ability to determine whether the feature is substantially correlated with the model feature.

At 130, a command can be transmitted in response to detecting the presence of the hazard within the forecourt of the fueling station. In some implementations, the command can include an instruction to generate a notification indicative of the presence of the hazard and to provide the notification to an end user device. In some implementations, the end user device can be a mobile device of a fueling station attendant, a fueling station owner, and/or other managers/administrators of the fueling station.

In some implementations, the notification can include a prompt that can be presented on an interactive display of the mobile device. In some implementations, the end user device can be a fueling station terminal in operable communication with a forecourt controller configured to manage fueling transactions occurring within the forecourt and that can be operated by the fueling station attendant. In such an implementation, the notification can include a prompt that can be presented on an interactive display of the forecourt controller. The prompt can include a message that is indicative of the type of hazard detected (e.g., that there is a fire or fuel leak at the forecourt, or that a vehicle operator is pulling away from the fuel dispenser with the fuel dispenser nozzle in the fuel filler inlet of the vehicle (in which case the prompt can further include a message to the driver to hang up the hose), etc.). In some implementations, the prompt can also provide response options for the user of the mobile device (e.g., fueling station attendant, fueling station owner, fueling station manager/administrator, etc.) to select and thereby take corrective action to mitigate the risk of harm to life or property presented by the hazard. For example, the prompt can provide an option to activate a fire suppression system and/or an alarm system, notify emergency personnel, and/or deactivate one or more portions of the fueling station. In some implementations, the prompt can also provide an option for the user to designate the detected hazard as a "false positive" or "false alarm" (i.e., the predictive model indicates the presence of a hazard when in fact no hazard is present). This designation can be provided to the predictive model for further training and improvement of the predictive model's performance.

In some implementations, such as when flames have been detected in the forecourt, the command can be provided to a fire suppression system disposed in the forecourt. The fire suppression system, which can include at least one sprinkler oriented toward the forecourt that is configured to dispense a fire extinguishing agent in the direction of the forecourt, can be activated in response to the received command and thereby dispense the fire extinguishing agent through the at least one sprinkler to mitigate the detected hazard.

In some implementations, the command can be provided to an alarm system having at least one speaker oriented toward the forecourt and in audible range of any customers or station attendants in the forecourt or surrounding areas (e.g., convenience store, car wash). The command can cause an audio message to be provided via the at least one speaker that is indicative of the detected hazard. In some implementations, the message can announce that a hazard has been detected. In some implementations, the message can announce the specific type of hazard detected (e.g., that a fire, flames, a lit cigarette and/or a fuel spill is/are present in the forecourt, that a vehicle operator is driving away with the fuel dispenser nozzle in the fuel filler inlet of the vehicle, and/or that a vehicle is traveling through the forecourt at a high rate of speed). In some implementations, the alarm system can include a strobe lamp that is visible from within the forecourt, and the command can cause the strobe lamp to illuminate to thereby indicate the hazard presence. In some implementations, the alarm system can have an audio speaker and/or a strobe lamp positioned in a convenience store proximate the forecourt that is configured to warn patrons inside the convenience store of the presence of the hazard in the forecourt.

In some implementations, the command can cause a notification of the detected hazard to be transmitted to the appropriate authorities based on the detected hazard. For example, if the detected hazard is the presence of flames in the forecourt, the command can cause a notification of the presence of flames in the forecourt to be transmitted to the local fire department.

In some implementations, the command can be received by the forecourt controller, which can cause some or all of the fueling station to be deactivated in response to the command. The command can indicate which portions (e.g., one or more fuel dispensers, the car wash, etc.) of the fueling station are to be deactivated by the forecourt controller, the determination of which is made based on a determination of which portions of the fueling station are impacted, or could be impacted, by the detected hazard. For example, if a fuel leak from a fuel dispenser is detected, the command can include an instruction to disable the flow of fuel to that dispenser to thereby stop the continued leakage of fuel from the fuel dispenser.

Figure 2:
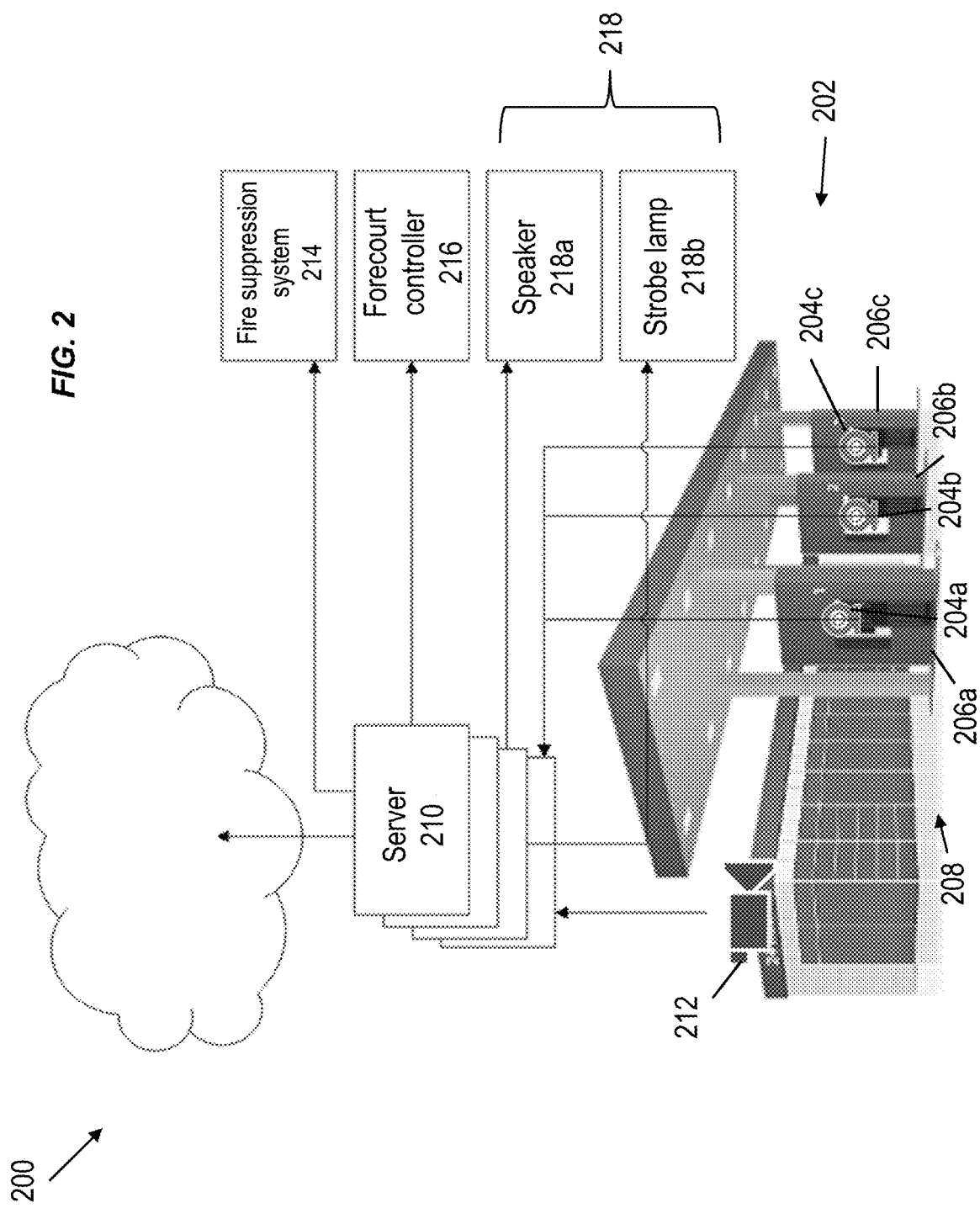
FIG. 2 is a schematic view illustrating components of an example system that can provide for automated threat detection and mitigation at a fueling station.

FIG. 2 is a schematic view illustrating components of an example system 200 for automated threat detection and mitigation at a fueling station. As shown, the system 200 can be located at a fueling station 202 and can include cameras 204a, 204b, 204c, each disposed on fuel dispensers 206a, 206b, 206c, respectively, and oriented such that at least a portion of a forecourt 208 of the fueling station 202 is in the field of view of the cameras 204a, 204b, 204c. Although system 200, as shown in FIG. 2, features three cameras 204a, 204b, 204c, any number of cameras can be used. The cameras 204a, 204b, 204c can be configured to acquire one or more images and/or a video feed of a forecourt 208 of the fueling station 202. The cameras 204a, 204b, 204c and the fuel dispensers 206a, 206b, 206c can be located in the forecourt 208 and can be in operable communication with a server 210 having at least one data processor and memory which can form a part of at least one computing system. The cameras 204a, 204b, 204c can each provide their respective acquired video feeds to the server 210. The server 210 may be located at the fueling station 202 or, in some implementations, the server 210 may be located offsite. The server 210 can also be in operable communication with a forecourt camera 212 that is oriented such that the forecourt 208 is within a field of view of the forecourt camera 212 and is configured to acquire one or more images and/or a video feed of the forecourt 208 and provide them to the server 210. The processor of the server 210 is configured to monitor the video feeds received from the cameras 204a, 204b, 204c and/or the forecourt camera 212 and use a predictive model to detect a presence of a hazard within the forecourt 208 of the fueling station 202.

The server 210 can also be operable communication with a fire suppression system 214 configured to dispense a fire extinguishing agent, a forecourt controller 216 that is configured to manage the fuel dispensers 206a, 206b, 206c, and an alarm system 218 that includes at least one speaker 218a and at least one strobe lamp 218b. Each of the fire suppression system 214, the forecourt controller 216, and the alarm system 218 can receive a command issued by the server 210 to take one or more of the actions described herein to mitigate any harm to life or property resulting from the hazard.

Figure 3A:
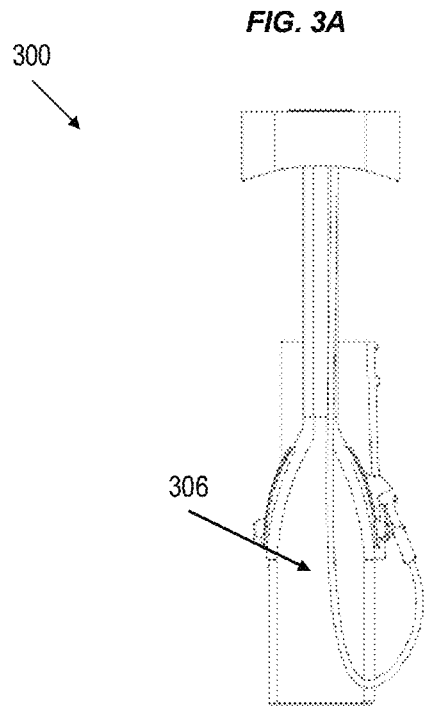
FIG. 3A is a side perspective view of one embodiment of a fuel dispenser.
Figure 3B:
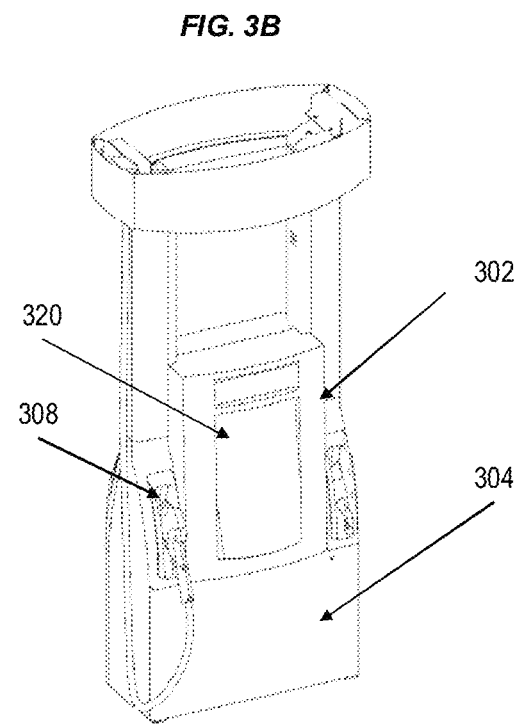
FIG. 3B is a front perspective view of the fuel dispenser shown in FIG. 3A.
Figure 4:
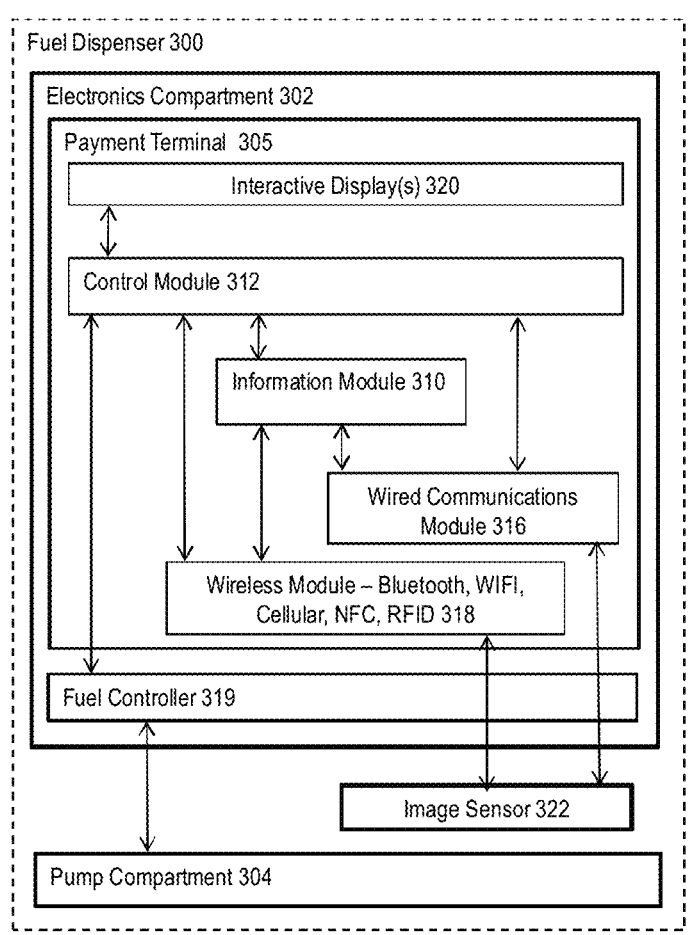
FIG. 4 is a diagram showing internal components of the fuel dispenser of FIGS. 3A and 3B.

FIGS. 3A and 3B illustrate one embodiment of a fuel dispenser 300 that can be used in some implementations of the current subject matter, and FIG. 4 illustrates components of the fuel dispenser. In general, the fuel dispenser 300 includes an electronics compartment 302, a pump compartment 304, and an image sensor 322. The pump compartment 304 houses a pump configured to pump fuel from a fuel tank or other reservoir, as well as one or more meters that can be configured to monitor fuel flow, flow of fuel additives, and/or flow of other components of the fuel. The pump compartment 304 can also include other components to facilitate fuel dispensing and mixing, such as motors and valves, a strainer/filtering system, a vapor recovery system, and the like. The pump compartment 304 is isolated from the electronics compartment 302 within the fuel dispenser 300 to facilitate safety, security, and/or maintenance, as will be appreciated by a person skilled in the art. Fuel is thus not allowed to flow from the pump compartment 304 to the electronics compartment 302 and instead flows from the pump compartment 304 through hoses 306 to nozzles 308 for dispensing. As will be appreciated by a person skilled in the art, the nozzles 308 are each configured to dispense fuel from the fuel dispenser 300 as pumped therefrom by the pump.

The electronics compartment 302 houses electronics for facilitating payment for fuel and for facilitating the dispensing of the fuel. For example, the electronics compartment 302 can include a fuel controller 319 that, at least in some implementations, includes a data processor, memory, and storage forming part of at least one computing system. The fuel controller 319 is configured to control dispensing of the fuel from the pump compartment 304. The electronics compartment 302 also includes a payment terminal 305 that is configured to provide a user with one or more options to create a desired fuel mixture, receive instructions characterizing the desired fuel mixture, receive payment information and/or user identification information from a user, transmit and receive the payment information and/or the user identification information with a POS system via a forecourt controller 406, and deliver fueling instructions to the fuel controller 319 to dispense fuel. The payment terminal 305 can also be configured to provide a user with information related to a status of fueling. For example, the payment terminal can display an amount of fuel that has been dispensed, and a corresponding fuel cost as the fuel mixture is dispensed.

The payment terminal 305 can be configured to facilitate communication between a user and the fuel controller 319, and can include an interactive display 320 and an information module 310. The information module 310 can, at least in some implementations include a data processor, memory, and storage, forming part of at least one computing system. The payment terminal 305 can also include one or more wired communication modules 316 and/or wireless communication modules 318 and a control module 312 that, at least in some implementations includes a data processor, memory, and storage, forming part of at least one computing system. The communication modules 316, 318 can function to allow data to be transmitted to and from various components within the payment terminal 305 via wired and/or wireless communication, respectively. For example, the communication modules 316, 318 can be configured to transmit and receive signals that can characterize, e.g., payment information, user identification information, and/or information regarding a desired fuel selection, via wired and/or wireless communications, respectively. The wireless communication module 318 can include, e.g., a transceiver for communicating via Bluetooth protocol, cellular protocol, WI-FI protocol, near field communication (NFC), and/or a radio frequency identification (RFID) protocol. Wired and/or wireless communication via the communication modules 316, 318 can be according to any of a variety of communication protocols, e.g., TCP/IP, etc., as will be appreciated by a person skilled in the art. The communication modules 316, 318 are also in operable communication with the image sensor 322 and are configured to receive image data acquired by the image sensor 322. The communication modules 316, 318 can additionally transmit the received image data for further external processing.

The interactive display 320, which can be, or can include, a touchscreen. The interactive display 320 can be operably coupled to the control module 312 which can be used to control, dynamically rearrange, and/or update a graphical user interface (GUI) rendered on the display 320. The display 320 can be configured to show information (e.g., media content, fuel selection options, payment information, user identification information, etc.) in the form of one or more graphical elements, or graphical objects, receive input (e.g., instructions for a desired fuel mixture, user identification information, payment information, etc.) thereon, and can deliver data characterizing the input to the control module 312 to be processed. Some examples of information that the display 320 can receive from the user are: total cost, desired fuel volume, desired fuel mixture, desired additives, an initiate fueling command, and a terminate fueling command. In some implementations, the user can provide user information, such as user preferences, contact information, etc., and/or information regarding a device that will consume the fuel, such as vehicle make, model, mileage, and the like. The user can also be provided with a recommend fuel blend which they can choose to select.

The subject matter described herein can provide several advantages. For example, the continuous monitoring and automated hazard detection provided by the predictive model can allow for more immediate threat mitigation efforts to be taken, as the predictive model can identify the hazard and take a variety of actions to protect life and property without requiring confirmation of the presence of the hazard from a fueling station attendant or other individuals present at the fueling station.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:
1. A method comprising:
receiving data characterizing a video feed acquired by a camera continuously and automatically gathering images, the camera being oriented toward and including a field of view of a forecourt of a fueling station;
continuously monitoring the video feed for hazards, the monitoring including performing automatic hazard detection on the video feed using at least one predictive model that predicts a presence of a hazard within the forecourt of the fueling station;
transmitting a command to a forecourt controller, the forecourt controller being configured to manage operation of the fueling station, the command causing the forecourt controller to deactivate at least a portion of the fueling station, and the command identifying the at least the portion of the fueling station to be deactivated;
causing a graphical prompt to be shown on an end user device, the graphical prompt being indicative of the predicted presence of the hazard and the graphical prompt including a first response option that designates the predicted presence of the hazard as a false alarm and a second response option for activing a fire suppression system disposed in the forecourt;
receiving, from the end user device, data characterizing a designation, by a user of the end user device interacting with the graphical prompt, of the predicted presence of the hazard as a false alarm; and
training the at least one predictive model by at least providing the data characterizing the designation to the at least one predictive model.
2. The method of claim 1, further comprising:
comparing an object present within the forecourt of the fueling station to at least one model object, the model object associated with the hazard;

determining a similarity measure for the object, the similarity measure indicative of a degree to which the object matches the model object; and transmitting an indication in response to the similarity measure exceeding a predetermined threshold.

3. The method of claim 1, wherein the end user device is an interactive display of the forecourt controller.

4. The method of claim 1, wherein the end user device is a mobile device in operable communication with the forecourt controller.

5. The method of claim 1, further comprising transmitting a fire suppression command to the fire suppression system which causes the fire suppression system to activate at least one sprinkler to dispense a fire extinguishing agent, the fire suppression command transmitted based on an interaction of the user with the second response option.

6. The method of claim 1, further comprising transmitting an alarm command to an alarm system having at least one speaker oriented toward the forecourt, the alarm command causing an audio message to be provided via the at least one speaker, the audio message indicative of the hazard presence.

7. The method of claim 1, wherein the automatic hazard detection includes deconstructing, with an edge detection algorithm of the at least one predictive model, an image of the video feed into at least one constituent part, and determining, with the at least one predictive model, a prediction of the presence of the hazard based on the at least one constituent part.

8. The method of claim 1, wherein the automatic hazard detection including deconstructing, with the at least one predictive model, an image of the video feed into at least one constituent part, determining, with the at least one predictive model, a word string that characterizes at least one constituent part, and determining, with the at least one predictive model, a prediction of the presence of the hazard based on the determined word string.

9. A system comprising:
at least one data processor; and
memory storing instructions configured to cause the at least one data processor to perform operations comprising:
receiving data characterizing a video feed acquired by a camera continuously and automatically gathering images, the camera being oriented toward and including a field of view of a forecourt of a fueling station;
continuously monitoring the video feed for hazards, the monitoring including performing automatic hazard detection on the video feed using at least one predictive model that predicts a presence of a hazard within the forecourt of the fueling station;
transmitting a command to a forecourt controller, the forecourt controller being configured to manage operation of the fueling station, the command causing the forecourt controller to deactivate at least a portion of the fueling station, and the command identifying the at least the portion of the fueling station to be deactivated;
causing a graphical prompt to be shown on an end user device, the graphical prompt being indicative of the predicted presence of the hazard and the graphical prompt including a first response option that designates the predicted presence of the hazard as a false alarm and a second response option for activing a fire suppression system disposed in the forecourt;

receiving, from the end user device, data characterizing a designation, by a user of the end user device interacting with the graphical prompt, of the predicted presence of the hazard as a false alarm; and
training the at least one predictive model by at least providing the data characterizing the designation to the at least one predictive model.

10. The system of claim 9, wherein the operations further comprise:
comparing an object present within the forecourt of the fueling station to at least one model object, the model object associated with the hazard;
determining a similarity measure for the object, the similarity measure indicative of a degree to which the object matches the model object; and
transmitting an indication in response to the similarity measure exceeding a predetermined threshold.

11. The system of claim 9, wherein the end user device is an interactive display of the forecourt controller.

12. The system of claim 9, wherein the end user device is a mobile device in operable communication with the forecourt controller.

13. The system of claim 9, wherein the operations further comprise transmitting a fire suppression command to the fire suppression system which causes the fire suppression system to activate at least one sprinkler to dispense a fire extinguishing agent, the fire suppression command transmitted based on an interaction of the user with the second response option.

14. The system of claim 9, wherein the operations further comprise transmitting an alarm command to an alarm system having at least one speaker oriented toward the forecourt, the alarm command causing an audio message to be provided via the at least one speaker, the audio message indicative of the hazard presence.

15. The system of claim 14, wherein the alarm system includes at least one strobe lamp oriented toward the forecourt, and the alarm command causes the strobe lamp to illuminate to thereby indicate the hazard presence.

16. A non-transitory computer program product storing instructions which, when executed by at least one data processor forming part of at least one computing system, cause the at least one data processor to implement operations comprising:
receiving data characterizing a video feed acquired by a camera continuously and automatically gathering images, the camera being oriented toward and including a field of view of a forecourt of a fueling station;
continuously monitoring the video feed for hazards, the monitoring including performing automatic hazard detection on the video feed using at least one predictive model that predicts a presence of a hazard within the forecourt of the fueling station;
transmitting a command to a forecourt controller, the forecourt controller being configured to manage operation of the fueling station, the command causing the forecourt controller to deactivate at least a portion of the fueling station, and the command identifying the at least the portion of the fueling station to be deactivated;
causing a graphical prompt to be shown on an end user device, the graphical prompt being indicative of the predicted presence of the hazard and the graphical prompt including a first response option that designates the predicted presence of the hazard as a false alarm and a second response option for activing a fire suppression system disposed in the forecourt;

receiving, from the end user device, data characterizing a designation, by a user of the end user device interacting with the graphical prompt, of the predicted presence of the hazard as a false alarm; and training the at least one predictive model by at least providing the data characterizing the designation to the at least one predictive model.

\* \* \* \* \*